Oct. 17, 1944.   C. W. CLARK   2,360,760
ADJUSTMENT MEANS FOR TESTING MACHINES
Filed Dec. 6, 1943
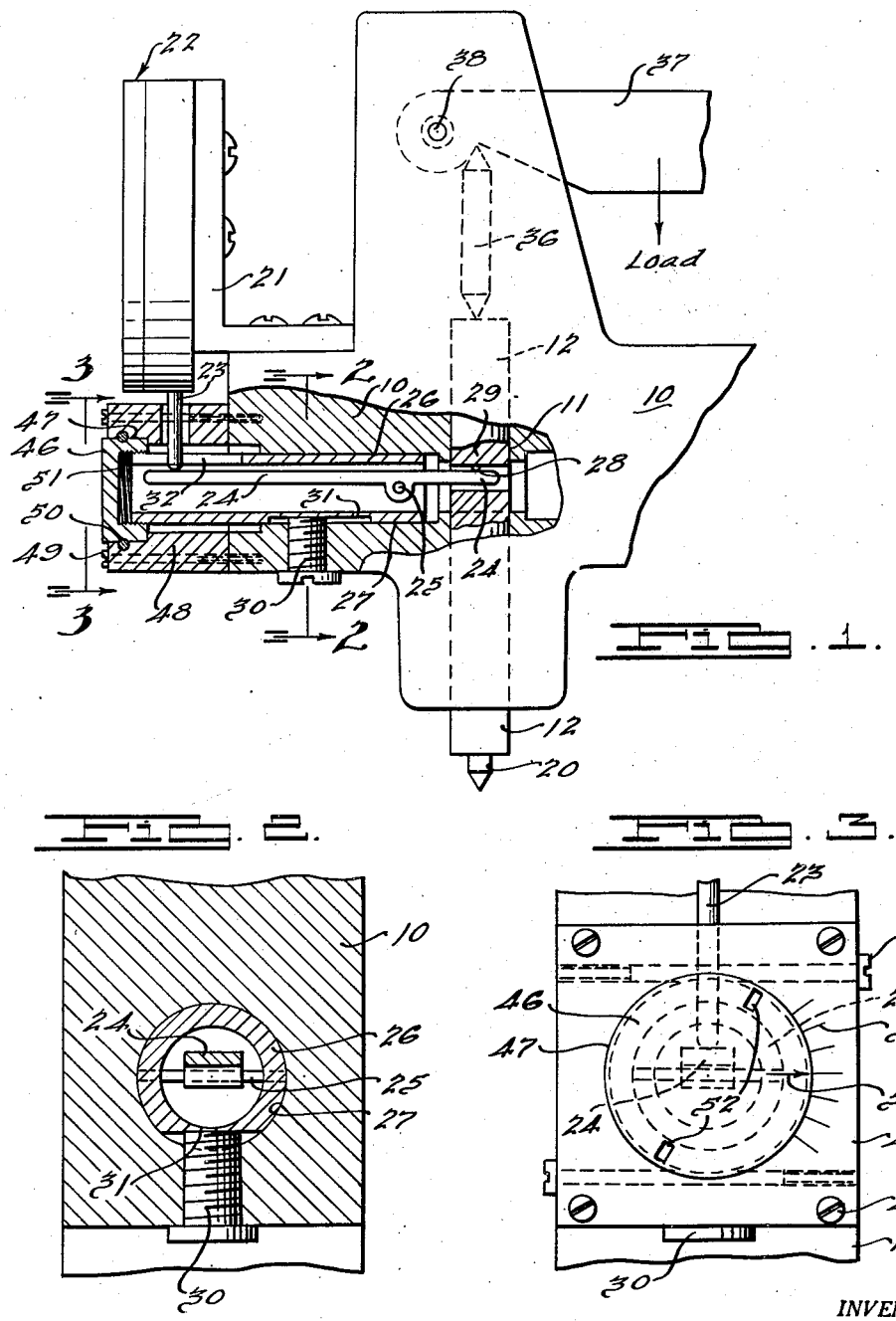
INVENTOR.
Clyde W. Clark
BY
Daniel G. Cullen.
ATTORNEY.

Patented Oct. 17, 1944

2,360,760

UNITED STATES PATENT OFFICE 2,360,760

ADJUSTMENT MEANS FOR TESTING MACHINES

Clyde W. Clark, Dearborn, Mich.

Application December 6, 1943, Serial No. 513,108

1 Claim. (Cl. 73—81)

This application relates to improvements in testing machines, as will later be described upon reference to the appended drawing.

In this drawing,

Fig. 1 is a side view.

Fig. 2 is a transverse section on line 2—2 of Fig. 1.

Fig. 3 is an end view as if from the left of Fig. 1.

The drawing shows a fragment of a hardness tester which is an instrument designed to test the hardness of metals by penetration of a diamond point into the metal, the extent of penetration, under a predetermined load, affording a measurement of the hardness, and being registered on an indicator to which the penetrating point is connected by a lever system.

The improvement herein disclosed is particularly a means for varying the lever system and thus varying the relation of the indicator, upon which the measurement is registered, with respect to the penetrator, whereby to vary the indicator reading with respect to the extent of penetration.

Only a fragment of a hardness tester is shown in the appended drawing. However, a complete hardness tester includes a C shaped frame in whose upper forward end is located the indicator, the lever system, the penetrating point, and the load system of the tester.

Now referring to the drawing, it will be seen that Fig. 1 shows the upper or forward end of the frame 10 in whose bore 11 is a spindle body 12 supported so as to be movable up or down a very slight amount. The lower end of the spindle carries the penetrating point 20.

On the forward end of the frame is a bracket 21 which fixedly rigidly mounts an indicator 22 whose movable element 23 is operatively connected to the spindle by a lever 24 fulcrumed on a pin 25 to a tube 26 mounted in a bore 27 of the frame. An end of the lever is positioned under a pressure point 28 formed on a portion 29 of the spindle.

The tube 26 is fixed against rotation in the bore 27 by a screw 30 which engages a flattened portion 31 of the tube, the tube, however, being free to move longitudinally. The side wall of the tube is slotted at 32 to permit the movable part 23 of the indicator 22 to enter it and engage the lever 24.

The upper end of the spindle is engaged by a link 36 whose upper end is seated in a groove of the load lever 37 fulcrumed to the frame at 38.

Both the spindle 12 and the indicator part 23 are fixed against relative movement in the direction of the longitudinal axis of the lever 24. The adjustment for the relation between the spindle and the indicator so as to vary the effect on the indicator part produced by a predetermined movement of the spindle is produced by varying the moment arms of the spindle and of the indicator part with respect to each other and this is accomplished by moving the fulcrum 25 towards or away from the spindle. This is done by means of a threaded nut 46 journalled in a counter bore 47 of a block 48 fixed by screws 49 to the frame 10, with the nut 46 held against longitudinal movement in its counter bore 47 by cross pins 50. The interior of the nut is threaded at 51 to cooperate with a thread on the outside of the tube 26. It is apparent that as the nut is rotated it will cause the tube 26 to move in a direction longitudinal of the lever 24 in a manner to vary the position of the fulcrum 25 with respect to the spindle and the indicator part 23. This adjustment varies the distance that the indicator part 23 will travel in response to a predetermined travel of the spindle.

The face of the nut is provided with slots 52 to permit the nut to be rotated by means of an adjustment tool fitting in these slots. On the face of the nut is an arrow or other pointer 53 cooperating with a set of markings 54 on the block 48 so that the person making the adjustment may have some guide in determining the extent of the adjustment he is making.

Now having described the adjustment means disclosed, reference should be had to the claim which follows.

I claim:

In a testing machine, a frame having a bore, a hollow support slidably mounted therein and fixed against rotation therein, a lever within the support and fulcrumed thereto, said lever having one end exposed beyond the support, a testing load bearing on the said exposed end of the lever, the support having a side wall cut away to expose another part of the lever, an indicator bearing on said other exposed part of said lever, and an exposed rotary element operatively connected to said support through screw threads for moving it longitudinally in the bore, with the lever, the hollow support having an open forward end, with the rotary element being a removable closure for such open end of the support, and a means for detachably holding the unit comprising the hollow support, the lever, and the rotary element in the bore of the frame, whereby such unit may readily be inserted into or removed from the bore as a unit, said means normally permitting the rotary element to be rotated manually while preventing its longitudinal movement in the bore, whereby the rotary element may be rotated to move the support longitudinally in the bore to adjust the position of the support and the lever with respect to the indicator and the testing load.

CLYDE W. CLARK.